(12) United States Patent
Pourbeyram Kaleibar et al.

(10) Patent No.: US 12,072,444 B2
(45) Date of Patent: *Aug. 27, 2024

(54) LiDAR SYSTEM IMPLEMENTING WAVELENGTH CONVERSION

(71) Applicant: NKB Properties Management, LLC, Great Neck, NY (US)

(72) Inventors: Hamed Pourbeyram Kaleibar, Bayside, NY (US); Paul Francis Mcmanamon, Dayton, OH (US); Yu-Hsiang Cheng, Basking Ridge, NJ (US); Michael Etienne, West Babylon, NY (US); Ohad Harlev, Closter, NJ (US)

(73) Assignee: NKB PROPERTIES MANAGEMENT, LLC, Great Neck, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,162

(22) Filed: Apr. 22, 2022

(65) Prior Publication Data

US 2022/0252698 A1  Aug. 11, 2022

Related U.S. Application Data

(63) Continuation of application No. 17/145,951, filed on Jan. 11, 2021, now Pat. No. 11,346,923.

(Continued)

(51) Int. Cl.
*G02F 1/355* (2006.01)
*G01S 7/481* (2006.01)

(52) U.S. Cl.
CPC ............ *G01S 7/481* (2013.01); *G02F 1/3551* (2013.01); *G02F 1/3558* (2013.01);
(Continued)

(58) Field of Classification Search
CPC ....... G02B 6/356; G02B 6/27; G02F 2202/07; G02F 2203/11; G02F 2203/07; G02F 2202/20; G01S 7/481
See application file for complete search history.

(56) References Cited

U.S. PATENT DOCUMENTS 6,259,552 B1   7/2001   Boffi et al.
6,603,592 B1   8/2003   Joyner et al.
(Continued)

FOREIGN PATENT DOCUMENTS

CA   2553437 A1    7/2006
WO   2009059598 A1   5/2009
(Continued)

OTHER PUBLICATIONS

United States Patent and Trademark Office, Office Action for U.S. Appl. No. 17/145,924, mailed May 11, 2021, 19pp.

(Continued)

*Primary Examiner* — Christopher Stanford
*Assistant Examiner* — Journey F Sumlar
(74) *Attorney, Agent, or Firm* — Amster Rothstein & Ebenstein LLP

(57) ABSTRACT

A wavelength converter for LiDAR systems, such as automotive LiDAR, is disclosed. Implementation of the wavelength converter in LiDAR systems makes possible generation and modulation of laser light in the silicon response region, conversion of the laser light to an eye-safe wavelength for emission and reflection from a target, and efficient conversion of the wavelength of the laser light to the silicon response region. The wavelength converter may implement a single-loop counter-propagating wavelength conversion scheme which provides both up-conversion and down-conversion of the signal within the same loop. The wavelength conversion design also has the potential for vehicle-to- (Continued)

vehicle (V2V) communication to enable a combined LiDAR and V2V communication system.

20 Claims, 10 Drawing Sheets

Related U.S. Application Data

(60) Provisional application No. 63/113,363, filed on Nov. 13, 2020.

(52) U.S. Cl.
CPC ...... *G02F 2202/20* (2013.01); *G02F 2203/07* (2013.01); *G02F 2203/11* (2013.01)

(56) References Cited

U.S. PATENT DOCUMENTS

| | | | |
|---|---|---|---|
| 6,839,365 | B1 | 1/2005 | Sonoda et al. |
| 6,947,206 | B2 | 9/2005 | Tsadka et al. |
| 6,972,894 | B2 | 12/2005 | Bjarklev et al. |
| 7,016,614 | B1 | 3/2006 | Kajiya et al. |
| 7,068,894 | B2 | 6/2006 | Prucnal et al. |
| 7,092,145 | B2 | 8/2006 | Takagi |
| 7,394,990 | B1 | 7/2008 | Yee |
| 7,433,561 | B2 | 10/2008 | Shahar |
| 8,027,589 | B2 | 9/2011 | Song et al. |
| 9,000,347 | B2 | 4/2015 | Woodward et al. |
| 9,191,117 | B2 | 11/2015 | Alexander et al. |
| 9,653,872 | B2 | 5/2017 | Di Teodoro et al. |
| 10,274,809 | B1 | 4/2019 | Pomeranz et al. |
| 2005/0175354 | A1 | 8/2005 | Vieira et al. |
| 2005/0244159 | A1 | 11/2005 | Chowdhury et al. |
| 2007/0201789 | A1 | 8/2007 | Bernasconi et al. |
| 2009/0310968 | A1 | 12/2009 | Kawanishi et al. |
| 2011/0013911 | A1 | 1/2011 | Alexander et al. |
| 2012/0132866 | A1 | 5/2012 | Nakamura |
| 2012/0236894 | A1 | 9/2012 | Onose et al. |
| 2013/0022358 | A1 | 1/2013 | Galameau et al. |
| 2013/0208256 | A1 | 8/2013 | Mamidipudi et al. |
| 2015/0131068 | A1 | 5/2015 | Takada |
| 2015/0377446 | A1 | 12/2015 | Bhakta et al. |
| 2018/0088215 | A1 | 3/2018 | Halbritter et al. |
| 2018/0120157 | A1 | 5/2018 | Kaufmann et al. |
| 2019/0098233 | A1 | 3/2019 | Gassend et al. |
| 2019/0353980 | A1 | 11/2019 | Shukunami et al. |
| 2020/0057142 | A1 | 2/2020 | Wang et al. |
| 2020/0348578 | A1 | 11/2020 | Nagano et al. |
| 2020/0386676 | A1 | 12/2020 | Stentz et al. |

FOREIGN PATENT DOCUMENTS

| | | |
|---|---|---|
| WO | 2012132866 A1 | 10/2012 |
| WO | 2018172115 A1 | 9/2018 |
| WO | 2019197242 A1 | 10/2019 |

OTHER PUBLICATIONS

International Searching Authority, Notification of Transmittal of the International Search Report and the Written Opinion of the International Searching Authority, or the Declaration, for International Appl. No. PCT/US2021/058888, date of mailing Feb. 3, 2022, 11 pp.

International Searching Authority, Notification of Transmittal of the International Search Report and the Written Opinion of the International Searching Authority, or the Declaration, for International Appl. No. PCT/US2021/058890, date of mailing Feb. 28, 2022, 10 pp.

U.S. Appl. No. 60/499,536, filed Sep. 2, 2003.

S. R. Nuccio, Z. Bakhtiari, O. F. Yilmaz, and A. E. Willner, "γ-conversion of 160-Gbit/s PDM 16-QAM using a single periodically-poled lithium niobate waveguide," Optics InfoBase Conference Papers, pp. 20-22 (2011), doi: 10.1364/ofc.2011.owg5.

P. Martelli, P. Boffi, M. Ferrario, L. Marazzi, P. Parolari, and R. Siano, "All-Optical Wavelength Conversion of a 100-GB/s Polarization-Multiplexed Signal," Optics Express, vol. 17, No. 20, pp. 179-181 (2009).

Hao Hu, Rahman Nouroozi, Reinhold Ludwig, Carsten Schmidt-Langhorst, Hubertus Suche, Wolfgang Sohter, and and C. Schubert, "110 km transmission of 160 Gbit/s RZ-DQPSK signals by midspan polarization-insensitive optical phase conjugation in a Ti:PPLN waveguide," Optics Letters, vol. 35, No. 17, p. 2867 (2010), doi: 10.1364/ofc.2011.pwg5.

F. Da Ros et al., "Wavelength conversion of QAM signals in a low loss CMOS compatible spiral waveguide," APL Photonics, vol. 2, No. 4 (2017), doi: 10.1063/1.4978945.

V. Pusino et al., "Wavelength conversion of real-time 100-GB/s POLMUX RZ-DQPSK," Conf. Opt. Fiber Commun. Tech. Dig. Ser., pp. 25-27 (2009), doi: 10.1364/ofc.2009.oths3.

X. Jiang, J. Wang, C. Gao, J. Xu, and H. Wan, "All-optical NRZ wavelength conversion using a Sagnac loop with optimized SOA characteristics," Journal of Semiconductors, vol. 36, No. 1 (2015), doi: 10.1088/1674-4926/36/1/014013.

Jiaqin Qian, Tao Yang, Mingyi Gao, Lian Xiang and Gangxiang Shen, "Seamless all-optical bidirectional wavelength converter," 2016 15th International Conference on Optical Communications and Networks (ICOCN), Hangzhou, 2016, pp. 1-3, doi: 10.1109/ICOCN.2016.7875743.

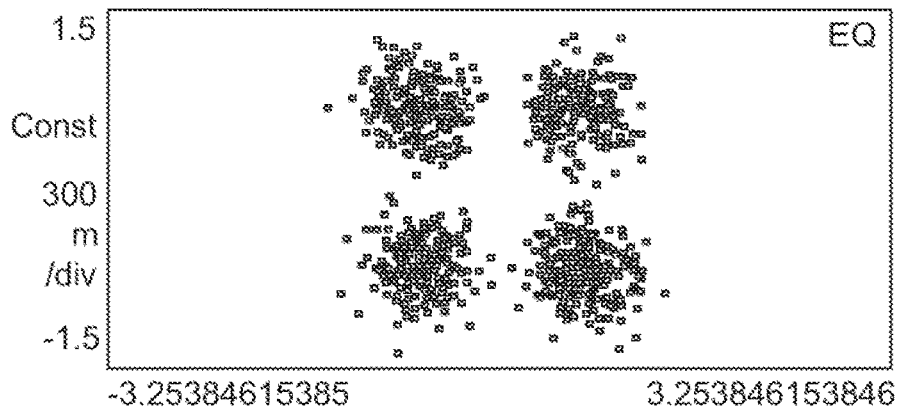
B: Optical Signal Summary
| | | |
|---|---|---|
| EVM | = 30.324 | %rms |
| EVM_pctl | = 99.913 | % |
| EVM_pctl Counts | = 12.000 | ksyms |
| Symbol Rate | = 34.166 | GHz |
| XY-Imbalance | = 0.01 | dB |
| Laser Linewidth | = 64.012 | kHz |
| Frequency Error | = 72.734 | MHz |
| Optical Power | = 1.5969 | dBm |
| Skew Ch1<->Ch2 | = 6313.5 | fs |
| Skew Ch1|<->Q | = 1148.3 | fs |
| Skew Ch2|<->Q | = 1932.5 | fs |
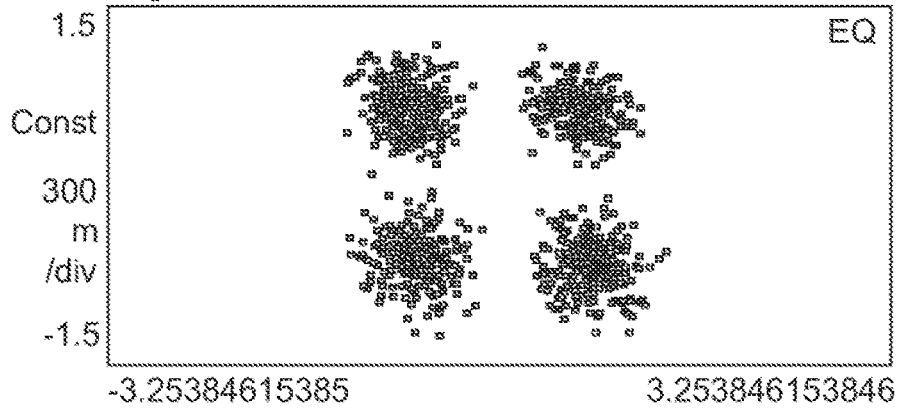
FIG. 7

LiDAR SYSTEM IMPLEMENTING WAVELENGTH CONVERSION

CROSS-REFERENCE TO RELATED APPLICATIONS

The present U.S. non-provisional patent application is a continuation application and claims the benefit of copending U.S. patent application Ser. No. 17/145,951, filed on Jan. 11, 2021, which claims the benefit of and priority to U.S. Provisional Patent Application No. 63/113,363, filed Nov. 13, 2020, the entire contents of each of which are incorporated herein by reference.

FIELD OF INVENTION

The present invention relates to light detection and ranging ("LiDAR") systems and methods. In particular, the present invention relates to wavelength conversion of a LiDAR signal, and in particular a laser signal used in automotive LiDAR systems. The present invention also relates to vehicle-to-vehicle (V2V) communications. The present invention further relates to a system that fuses data from LiDAR and V2V communication systems.

BACKGROUND OF THE INVENTION

A LiDAR system generally includes a transmitter and a receiver. The transmitter generates and modulates laser light and emits it for reflection from a target. At least part of the laser light that reflects from the target is returned to the receiver of the LiDAR system. The receiver includes a detector and a LiDAR sensor. The detector detects the received laser light and directs it to the LiDAR sensor which, together with associated electronics, determines the distance to the object based on the amount of time it took the laser pulse to travel to and return from the object or the frequency shift in the reflection process.

An important issue in a LiDAR system is what wavelength to use for the laser light. The current state of the art has two major competing wavelength regions for use in high-volume LiDAR applications, such as automotive LiDAR systems. One wavelength region runs from the visible spectrum up to about 1 μm. Many LiDAR systems in this wavelength region operate at a wavelength of 905 nm. One major company has a LiDAR system at 850 nm. Other wavelengths are also used, but the use of this band of wavelengths is determined by the easy detection of this band of wavelengths by silicon detectors. This wavelength region usually uses inexpensive diode lasers that match the band of the receivers. For example, 905 nm laser diodes are inexpensive and are readily available. Thus, the major benefit of this wavelength region is lower cost and, not surprisingly, a significant majority of the automotive LiDAR companies operate in this band of wavelengths.

However, the major disadvantage of this wavelength region is that it is in a spectral band that does not allow for high flux levels hitting the human eye. Laser eye damage is a major design constraint for many automotive LiDAR companies. As shown in FIG. 1 (which is reproduced from page 15 of *LiDAR Technologies and Applications* by Dr. Paul McManamon, published in 2019), the allowed laser flux (power per unit area) is approximately 1,000,000 times higher at a wavelength 1550 nm than it is at a wavelength 905 nm for nanosecond-pulse-width lasers. The ambient noise due to solar spectral irradiance is smaller at 1550 nm band compared to 905 and 850 nm bands.

The other major competing wavelength region for high-volume LiDAR applications is in the region of 1550 nm. Longer range high-volume LiDARs tend to use this wavelength because of the high laser energy that it allows. The major disadvantage of this wavelength region is the need to use detectors that can respond to this wavelength, such as InGaAs. While some automotive LiDAR companies can keep the cost of the detectors down by only using single detectors, this approach does limit the design space.

Currently, at least 80% of automotive LiDAR systems operate in the shorter wavelength (e.g., 905 nm) regime. There are limited options to increase the range of a LiDAR system operating at this wavelength while maintaining eye safety. One of the best options currently available is to increase the laser aperture size. Increasing the aperture size spreads out the laser power on transmit, and captures more light on receive, thereby allowing lower laser flux with increased peak laser power. However, increasing the laser aperture increases the size and weight of the LiDAR system.

There is, therefore, a need for an apparatus and method that overcomes one or more of the above and other deficiencies, and that could allow the majority of automotive LiDAR companies operating in the visible to near 1 μm region to dramatically reduce their eye-safety constraints without making major changes to their LiDAR systems.

Vehicle-to-vehicle (V2V) communications involve sending and receiving signal to and from neighboring vehicles to communicate information and to identify the neighboring vehicles. This will increase the line of sight, enhance the detection and ranging, and potentially increase the safety and reduce collision risks. V2V communications could be done using a GPS signal or using optical signals. Due to lower solar irradiance noise at 1550 nm compared to 905 and 850 nm, and due to the same eye safety concerns, the optical V2V communications tend to operate at a 1550 nm band. As mentioned for the LiDAR application, the cost and complexity for 1550 nm makes it less undesirable. Accordingly, there is a need for a wavelength conversion system to enable the low-cost signal generation and detection at a 905 nm or 850 nm band and conversion to a 1550 nm band for transmission to the surrounding environment or to neighboring vehicles. As both LiDAR and V2V systems increase safety and a wavelength conversion solves the above-mentioned issues for both systems, there is a need to design a compact and combined system for both applications.

SUMMARY OF THE INVENTION

It has now been found that the above and related objects of the present invention are obtained in the form of several related aspects, including generation and modulation of laser light in the silicon response region, conversion of the laser light to an eye-safe wavelength for emission and reflection from a target, and efficient conversion of the wavelength of the reflected laser light to the silicon response region. This may allow a LiDAR system to be built using lower cost silicon components while emitting laser light in a wavelength region that is safer to the human eye.

More particularly, the present invention relates to a LiDAR system. The LiDAR system includes an emitter that emits laser light having a first wavelength; a wavelength converter that converts the emitted laser light from the first wavelength to a second wavelength before the laser light is transmitted toward the target and, after reflected laser light is received from the target, converts the reflected laser light from the second wavelength to the first wavelength; and a detector that receives the reflected laser light having the first wavelength from the wavelength converter.

In at least one embodiment, the wavelength converter includes a wavelength-conversion loop that converts the first wavelength to the second wavelength and converts the second wavelength to the first wavelength, the wavelength-conversion loop comprising a first wavelength-conversion medium and a second wavelength-conversion medium.

In at least one embodiment, the first wavelength-conversion medium converts the first wavelength to the second wavelength or converts the second wavelength to the first wavelength based on a direction that the emitted laser light or the reflected laser light travels through the first wavelength-conversion medium.

In at least one embodiment, the first wavelength-conversion medium may be a non-linear medium.

In at least one embodiment, the first wavelength-conversion medium may be periodically poled lithium niobate.

In at least one embodiment, the second wavelength-conversion medium converts the first wavelength to the second wavelength or converts the second wavelength to the first wavelength based on a direction that the emitted laser light or the reflected laser light travels through the second wavelength-conversion medium.

In at least one embodiment, the second wavelength-conversion medium may be a non-linear medium.

In at least one embodiment, the second wavelength-conversion medium may be periodically poled lithium niobate.

In at least one embodiment, the emitted laser light includes a first polarization component and a second polarization component, wherein both the first polarization component and the second polarization component have the first wavelength; the first wavelength-conversion medium converts the first wavelength of the first polarization component to the second wavelength; and the second wavelength-conversion medium converts the first wavelength of the second polarization component to the second wavelength.

In at least one embodiment, the reflected laser light includes a first polarization component and a second polarization component, wherein both the first polarization component and the second polarization component have the second wavelength; the first wavelength-conversion medium converts the second wavelength of the first polarization component to the first wavelength; and the second wavelength-conversion medium converts the second wavelength of the second polarization component to the first wavelength.

In at least one embodiment, both the first wavelength and the second wavelength are transmitted to the target.

In at least one embodiment, telecommunication information is transmitted along with the LiDAR signal.

In at least one embodiment, wavelength converter includes a first port; a second port; and a wavelength-conversion medium coupled to the first port and the second port; wherein: the first wavelength is received at the first port is converted to the second wavelength by the wavelength-conversion medium and is provided to the second port; and the second wavelength is received at the second port and is converted to the first wavelength by the wavelength-conversion medium and is provided to the first port.

In at least one embodiment, the wavelength-conversion medium converts the first wavelength to the second wavelength based on a direction that the emitted laser light travels through the wavelength-conversion medium; and the wavelength-conversion medium converts the second wavelength to the first wavelength based on a direction that the reflected laser light travels through the wavelength-conversion medium.

In at least one embodiment, the wavelength-conversion medium may be a non-linear medium.

In at least one embodiment, the wavelength-conversion medium may be periodically poled lithium niobate.

In at least one embodiment, the detector may be a silicon detector.

In at least one embodiment, the first wavelength is in a wavelength region that runs from the visible spectrum up to about 1 µm.

In at least one embodiment, the first wavelength is about 905 nm.

In at least one embodiment, the second wavelength is about 1550 nm.

Although specific features, capabilities and advantages have been enumerated above, various embodiments may include some, none, or all of the enumerated features, capabilities and advantages. These and other technical features, capabilities and advantages of the disclosed subject matter, along with the invention itself, will be more fully understood after a review of the following figures, detailed descriptions and claims.

BRIEF DESCRIPTION OF THE DRAWINGS

Exemplary embodiments of the present invention will be described with reference to the accompanying figures, wherein:

FIG. 7 shows output signals provided by the embodiment of the wavelength conversion scheme shown in FIG. 5.

DETAILED DESCRIPTION OF PREFERRED EMBODIMENTS

Figure 2:
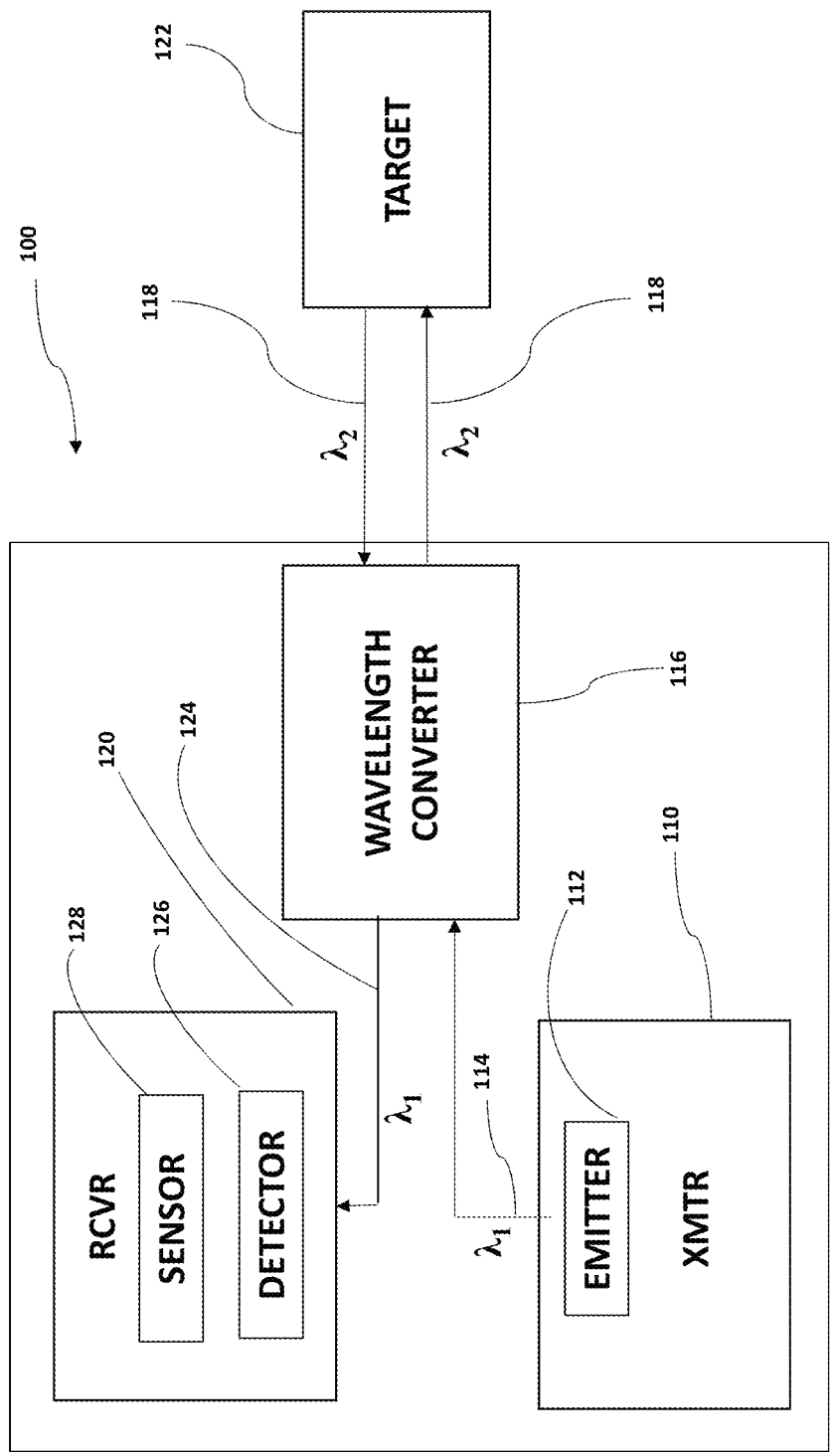
FIG. 2 is a block diagram of elements of a LiDAR system in accordance with the present invention.

FIG. 2 shows a block diagram of an embodiment of a LiDAR system 100 in accordance with the present invention. LiDAR system 100 generally includes a transmitter 110 and a receiver 120. The transmitter 110 generates and modulates laser light. Emitter 112 emits laser light 114 having a wavelength $\lambda_1$ to wavelength converter 116, where it is converted from wavelength $\lambda_1$ to wavelength $\lambda_2$. Converted laser light 118 having wavelength $\lambda_2$ is then sent to target 122.

At least part of the laser light 118 that is reflected from target 122 is returned to the wavelength converter 116, which converts it to reflected laser light 124 having a wavelength $\lambda_1$. The receiver 120 includes a detector 124 and a sensor 128. The detector 124 detects the reflected laser light 124 and directs it to the sensor which, together with associated electronics (not shown), determines the distance to the target 122 based on the amount of time it took the laser pulse to travel to and return from the object.

In an exemplary embodiment of the present invention, emitter 112 emits laser light 114 having a wavelength $\lambda_1$ of 905 nm and wavelength converter 116 down-converts it to laser light 118 having a wavelength $\lambda_2$ of 1550 nm. ("Down-conversion" refers to a process by which the frequency of a signal is shifted down (i.e., decreased). In view of the inverse relationship between the frequency of an electromagnetic wave signal and its wavelength, the wavelength of a down-converted signal is increased.)

In an exemplary embodiment of the present invention, the detector 126 is a silicon detector and wavelength converter 116 up-converts the reflected laser light 118 to laser light 124 having a wavelength of 905 nm. ("Up-conversion" refers to a process by which the frequency of a signal is shifted up (i.e., increased). In view of the inverse relationship between the frequency of an electromagnetic wave signal and its wavelength, the wavelength of an up-converted signal is decreased.)

Figure 3:
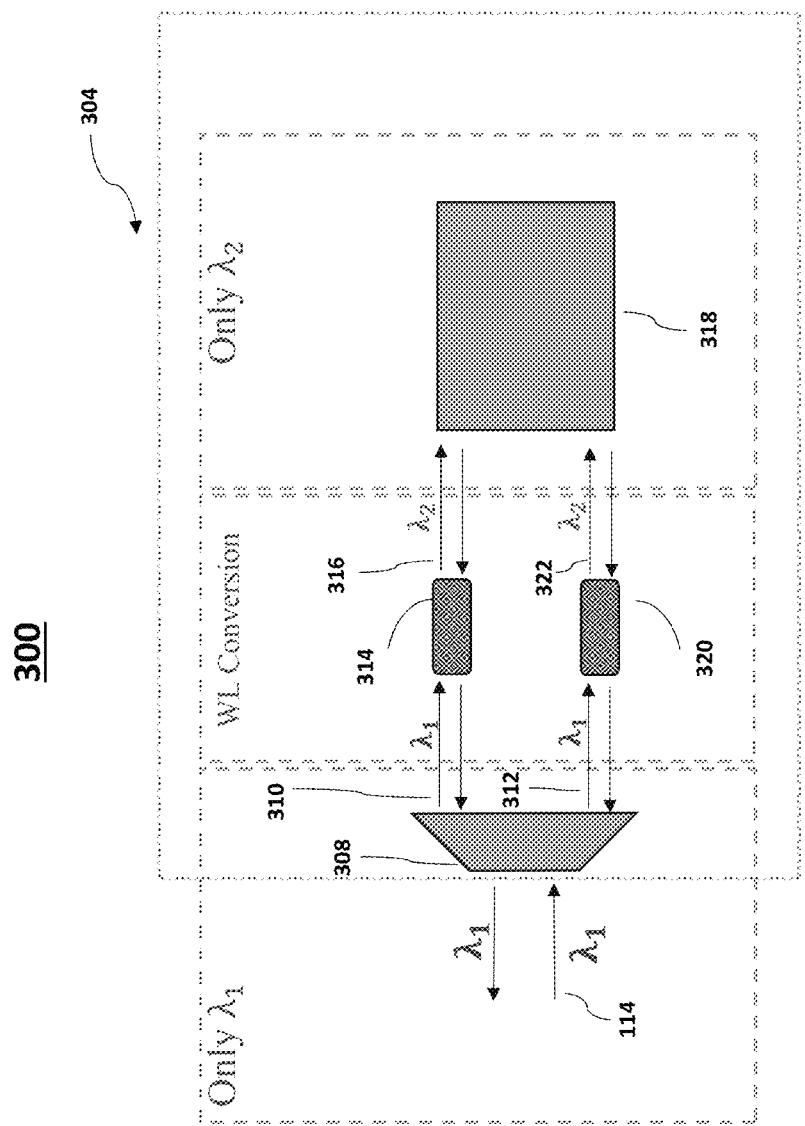
FIG. 3 is showing a wavelength conversion scheme for a LiDAR system in accordance with the present invention.

As shown in FIG. 2, wavelength converter 116 must provide consecutive down-conversion of emitted laser light 114 and up-conversion of reflected laser light 118. FIG. 3 shows a single-loop, counter-propagating wavelength conversion scheme 300 implemented in wavelength converter 116 in accordance with embodiments of the present invention. Wavelength conversion is done using a wavelength converting component such as a non-linear medium. As is well known to those of skill in the art, mixing a laser input signal and a pump laser signal in a non-linear medium, such as a PPLN waveguide, shifts the wavelength of the laser input signal to a different wavelength due to sum- and difference-frequency generation. As shown in FIG. 3, wavelength conversion scheme 300 uses two such non-linear media 314, 320, which makes it capable of converting dual-polarization signals. In preferred embodiments, one or both of non-linear media 314, 320 may be a periodically poled lithium niobate ("PPLN") waveguide.

Figure 1:
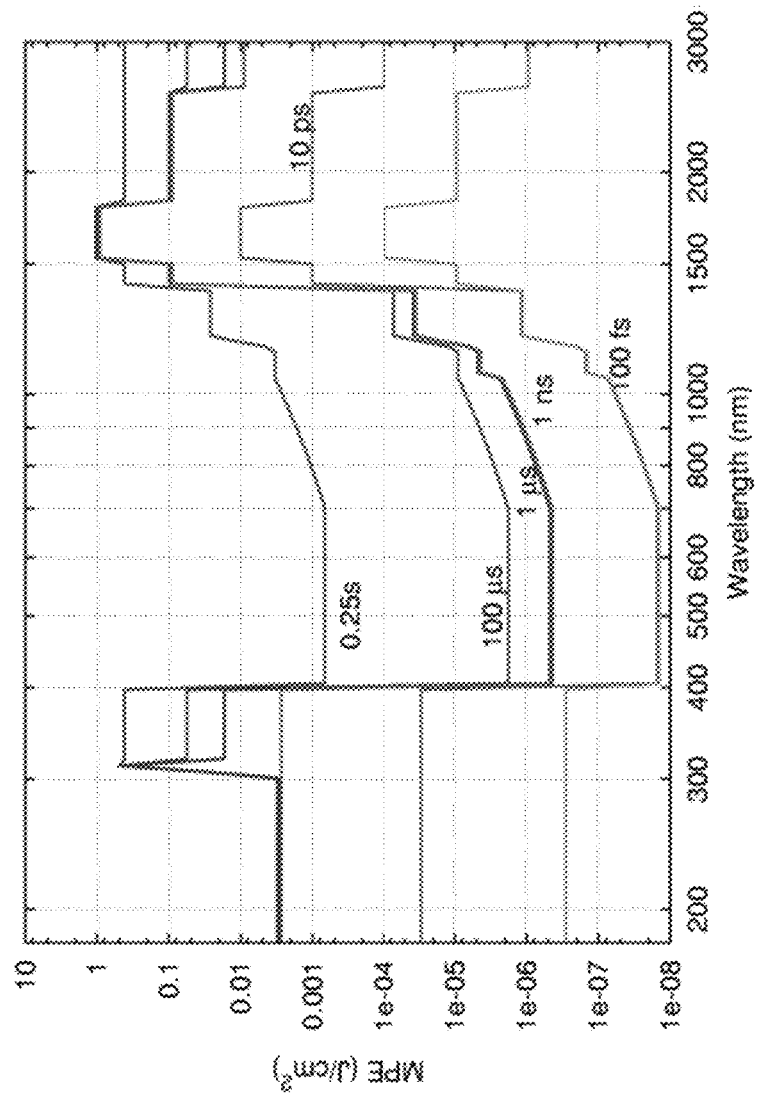
FIG. 1 is a graph of allowed laser flux for pulsed lasers.

The input signal 114 having a wavelength $\lambda_1$ (see FIG. 1) is provided to a wavelength conversion loop 304. If input signal 114 is a single-polarization signal, then it may exit polarization multiplexer/demultiplexer 308 in either the clockwise or counter-clockwise direction of loop 304. If clockwise, then wavelength converting component such as a PPLN 314 will convert the wavelength of input signal 114 from $\lambda_1$ to $\lambda_2$. If counter-clockwise, then wavelength converting component 320 will convert the wavelength of input signal 114 from $\lambda_1$ to $\lambda_2$. In either event, the signal 118 having a wavelength $\lambda_2$ is provided at an output of a processing unit 318 (e.g., a polarization multiplexer/demultiplexer) and is sent to target 122.

If input signal 114 is a dual-polarization signal, polarization multiplexer/demultiplexer 308 separates the input signal 114 into a first polarization component 310 and a second polarization component 312. The first polarization component 310 travels clockwise around wavelength conversion loop 304 and is provided to wavelength converting component 314. Wavelength converting component 314 converts the wavelength of the first polarization component 310 from $\lambda_1$ to $\lambda_2$ and provides a converted first polarization component 316 to a polarization multiplexer/demultiplexer 318. Similarly, the second polarization component 312 travels counter-clockwise around loop 304 and is provided to wavelength converting component 320. Wavelength converting component 320 converts the wavelength of the second polarization component 312 from $\lambda_1$ to $\lambda_2$ and provides a converted second polarization component 322 to processing unit 318.

The converted first and second polarization components 316, 322 are combined in processing unit 318 into signal 118 having a wavelength $\lambda 2$. Signal 118 is then sent to target 122.

Wavelength conversion loop 304 is also used to convert laser signal 118 having wavelength $\lambda_2$ to laser signal 124 having wavelength $\lambda_1$. If laser signal 118 is a single-polarization signal, then it may proceed to either wavelength converting component 320 or wavelength converting component 314 after it exits polarization multiplexer/demultiplexer 318. Thus, either wavelength converting component 314 or wavelength converting component 320 will convert laser signal 118 having wavelength $\lambda_2$ to laser signal 124 having wavelength $\lambda_1$. In either event, laser signal 124 having a wavelength $\lambda_1$ exits wavelength conversion loop 304 through polarization multiplexer/demultiplexer 308 and is provided to detector 126.

If laser signal 118 is a dual-polarization signal, when laser signal 118 is returned to polarization multiplexer/demultiplexer 318, polarization multiplexer/demultiplexer 318 separates it back into converted first and second polarization components 316, 322. Converted first polarization component 316 is then provided to wavelength converting component 320, which converts the wavelength of converted first polarization component 316 from $\lambda_2$ back to $\lambda_1$, thereby restoring original first polarization component 310. Similarly, converted second polarization component 322 is then provided to wavelength converting component 314, which converts the wavelength of converted second polarization component 322 from $\lambda_2$ back to $\lambda_1$, thereby restoring original second polarization component 312. Both first and second polarization components 310, 312 then complete their respective trips around wavelength conversion loop 304 and are re-combined in polarization multiplexer/demultiplexer 308 to provide laser signal 124 having wavelength $\lambda_1$. Laser signal 124 exits wavelength conversion loop 304 through a polarization multiplexer/demultiplexer such as polarizing beam splitter/combiner 308, and is provided to detector 126.

Figure 4:
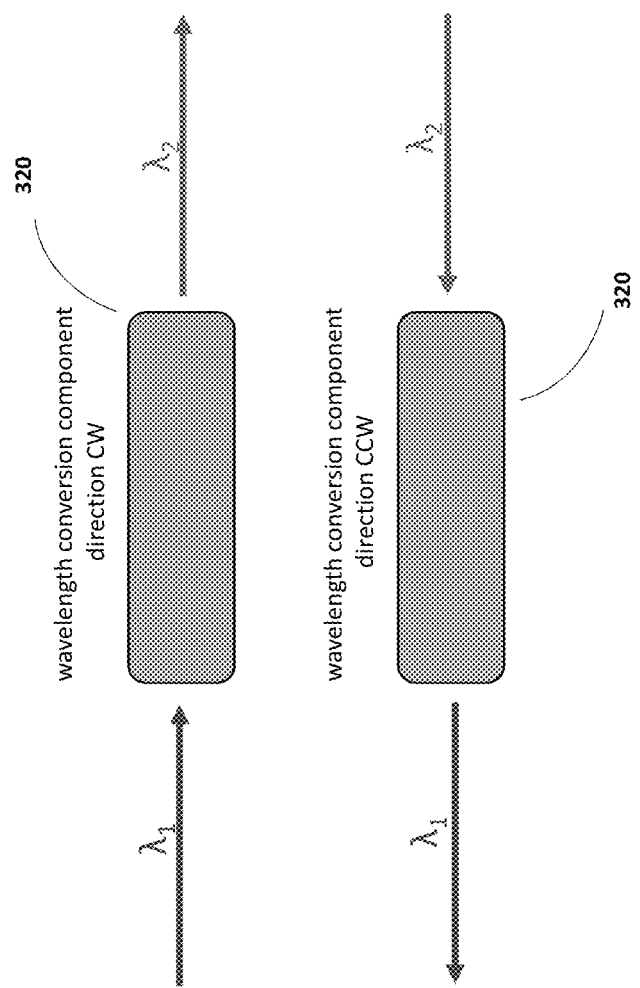
FIG. 4 illustrates an aspect of the wavelength conversion scheme shown in FIG. 3.

In the single-loop wavelength conversion scheme shown in FIG. 3, each one of wavelength converting component 314, 320 provides both up-conversion and down-conversion of the polarization components that pass through it, depending upon the direction in which the polarization component passes through the wavelength converting component. As described in connection with FIG. 3, and as shown in FIG. 4, when converted first polarization component 316 passes through wavelength converting component 320 in a clockwise direction after leaving polarization multiplexer/demultiplexer 318, wavelength converting component 320 up-converts first polarization component 316 from a wavelength $\lambda_2$ (e.g., 1550 nm) to a wavelength $\lambda_1$ (e.g., 905 nm). In contrast, when second polarization component 312 passes through wavelength converting component 320 in a counter-clockwise direction after leaving polarization multiplexer/demultiplexer 308, wavelength converting component 320 down-converts second polarization component 312 from a wavelength $\lambda_1$ (e.g., 905 nm) to a wavelength $\lambda_2$ (e.g., 1550 nm).

Similarly, when first polarization component 310 passes through wavelength converting component 314 in a clockwise direction after leaving polarization multiplexer/demultiplexer 308, wavelength converting component 314 down-converts first polarization component 310 from a wavelength $\lambda_1$ (e.g., 905 nm) to a wavelength $\lambda_2$ (e.g., 1550 nm). In contrast, when converted second polarization component 322 passes through wavelength converting component 314 in a counter-clockwise direction after leaving polarization multiplexer/demultiplexer 318, wavelength converting component 314 up-converts second polarization component 322 from a wavelength $\lambda_2$ (e.g., 1550 nm) to a wavelength $\lambda_1$ (e.g., 905 nm).

Figure 5:
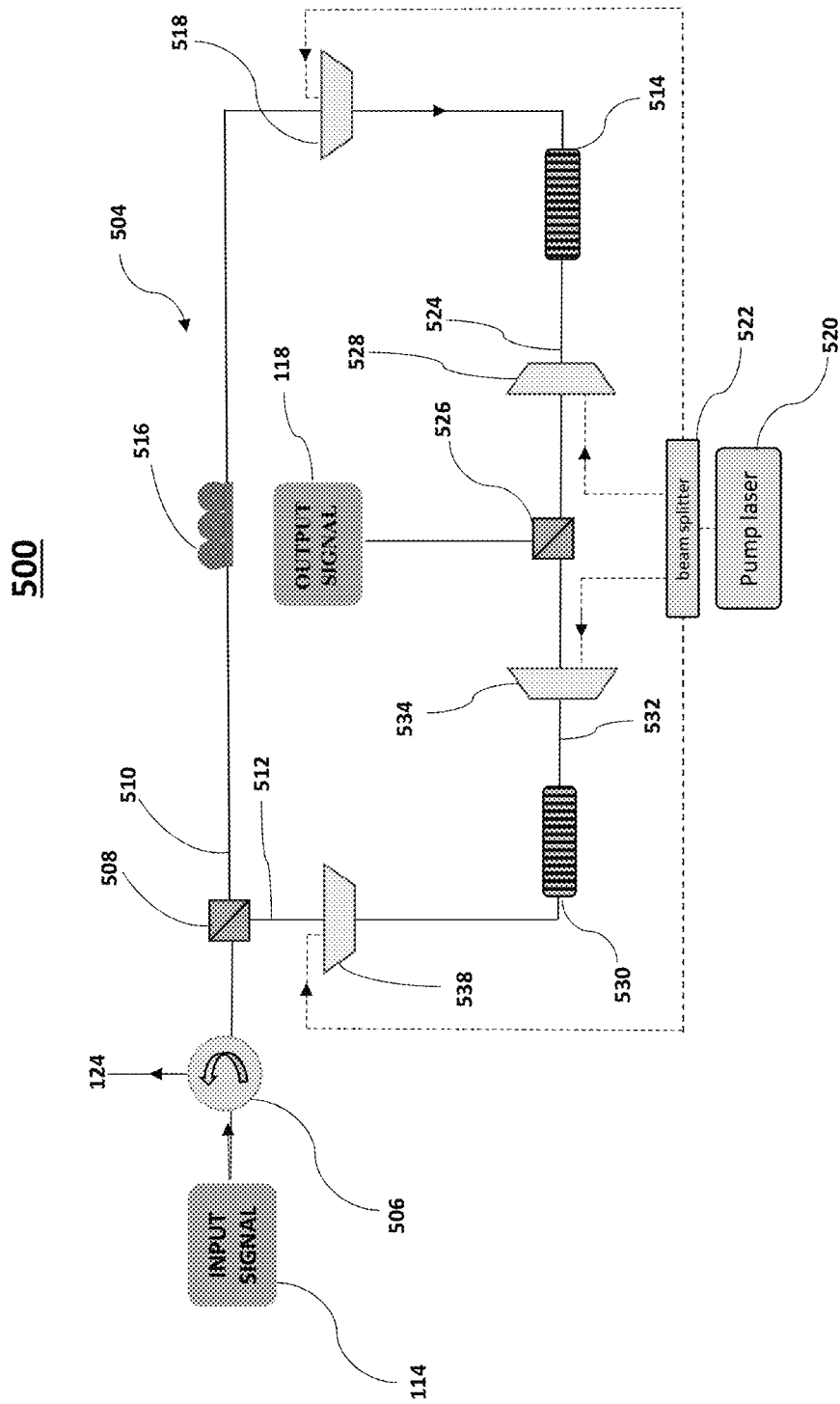
FIG. 5 shows a schematic diagram of an embodiment of a wavelength conversion scheme in accordance with the present invention.

FIG. 5 shows an alternative embodiment of wavelength converter 116 using a wavelength conversion scheme 500. Laser signal 114 (see FIG. 1) having a wavelength $\lambda_1$ is provided to a wavelength conversion loop 504 through a circulator 506. If input signal 114 is a single-polarization signal, then it may exit polarization multiplexer/demultiplexer 508 in either the clockwise or counter-clockwise direction of loop 504. If clockwise, then wavelength converting component 514 will convert the wavelength of input signal 114 from $\lambda_1$ to $\lambda_2$. If counter-clockwise, then wavelength converting component 530 will convert the wavelength of input signal 114 from $\lambda_1$ to $\lambda_2$. In either event, the laser signal 118 having a wavelength $\lambda_2$ is provided at an output of polarization multiplexer/demultiplexer 526 and is sent to target 122.

If input signal 114 is a dual-polarization signal, polarization multiplexer/demultiplexer 508 separates the laser signal 114 into a first polarization component 510 and a second polarization component 512. The first polarization component 510 travels clockwise around wavelength conversion loop 504 and is provided to wavelength converting component 514 through an optional polarization controller 516 and a wavelength-division multiplexer 518 (if needed). Polarization controller 516 can be used to eliminate possible crosstalk between the first and second polarization components 510, 512. The wavelength conversion in wavelength converting component 514 is based on the sum- and difference-frequency generation in wavelength converting component 514 using a pump laser 520 (if needed). The pump laser 520 is provided to wavelength converting component 514 through a beam splitter 522 and wavelength-division multiplexer 518 (if needed). Wavelength converting component 514 converts the wavelength of the first polarization component 510 from $\lambda_1$ to $\lambda_2$ and provides a converted first polarization component 524 to a polarization multiplexer/demultiplexer 526 through wavelength-division multiplexer 528.

Similarly, the second polarization component 512 travels counter-clockwise around loop 504 and is provided to wavelength converting component 530 through a wavelength-division multiplexer 538 (if needed). The wavelength conversion in wavelength converting component 530 is based on the sum- and difference-frequency generation in wavelength converting component 530 using pump laser 520, which is provided to wavelength converting component 530 through a beam splitter 522 and wavelength-division multiplexer 538. Wavelength converting component 530 converts the wavelength of the second polarization component 512 from $\lambda_1$ to $\lambda_2$ and provides a converted second polarization component 532 to polarization multiplexer/demultiplexer 526 through wavelength-division multiplexer 534.

The converted first and second polarization components 524, 532 are combined in polarization multiplexer/demultiplexer 526 into an output signal 118 having a wavelength $\lambda_2$. Optical signal 118 having wavelength $\lambda_2$ is then sent to target 122.

Wavelength conversion loop 504 is also used to convert laser signal 118 having wavelength $\lambda_2$ to laser signal 124 having wavelength $\lambda_1$. If laser signal 118 is a single-polarization signal, then it may proceed to either wavelength converting component 530 or wavelength converting component 514 after it exits polarization multiplexer/demultiplexer 526. Thus, either wavelength converting component 514 or wavelength converting component 530 will convert laser signal 118 having wavelength $\lambda_2$ to laser signal 124 having wavelength $\lambda_1$. In either event, laser signal 124 having a wavelength $\lambda_1$ exits wavelength conversion loop 504 through polarization multiplexer/demultiplexer 508 and is provided to detector 126 via an output of circulator 506.

If laser signal 118 is a dual-polarization signal, when laser signal 118 is returned to polarization multiplexer/demultiplexer 526, polarization multiplexer/demultiplexer 526 separates it back into converted first and second polarization components 524, 532. Converted first polarization component 524 is then provided to wavelength converting component 530 through wavelength-division multiplexer 534, which converts the wavelength of converted first polarization component 524 from $\lambda_2$ back to $\lambda_1$, thereby restoring original first polarization component 510. This wavelength conversion in wavelength converting component 530 is based on the sum- and difference-frequency generation in PPLN 530 using pump laser 520, which is provided to wavelength converting component 530 through a beam splitter 522 and wavelength-division multiplexer 534.

Similarly, converted second polarization component 532 is then provided to wavelength converting component 514 through wavelength-division multiplexer 528, which converts the wavelength of converted second polarization component 532 from $\lambda_2$ back to $\lambda_1$, thereby restoring original second polarization component 512. This wavelength conversion in wavelength converting component 514 is based on the sum- and difference-frequency generation in wavelength converting component 514 using pump laser 520, which is provided to wavelength converting component 514 through a beam splitter 522 and wavelength-division multiplexer 528.

Both first and second polarization components 510, 512 then complete their respective trips around wavelength conversion loop 504 and are re-combined in polarization multiplexer/demultiplexer 508 to provide laser signal 124 having wavelength Laser signal 124 exits wavelength conversion loop 504 through polarization multiplexer/demultiplexer 508 and is provided to detector 126 via an output of circulator 506.

Figure 5A:
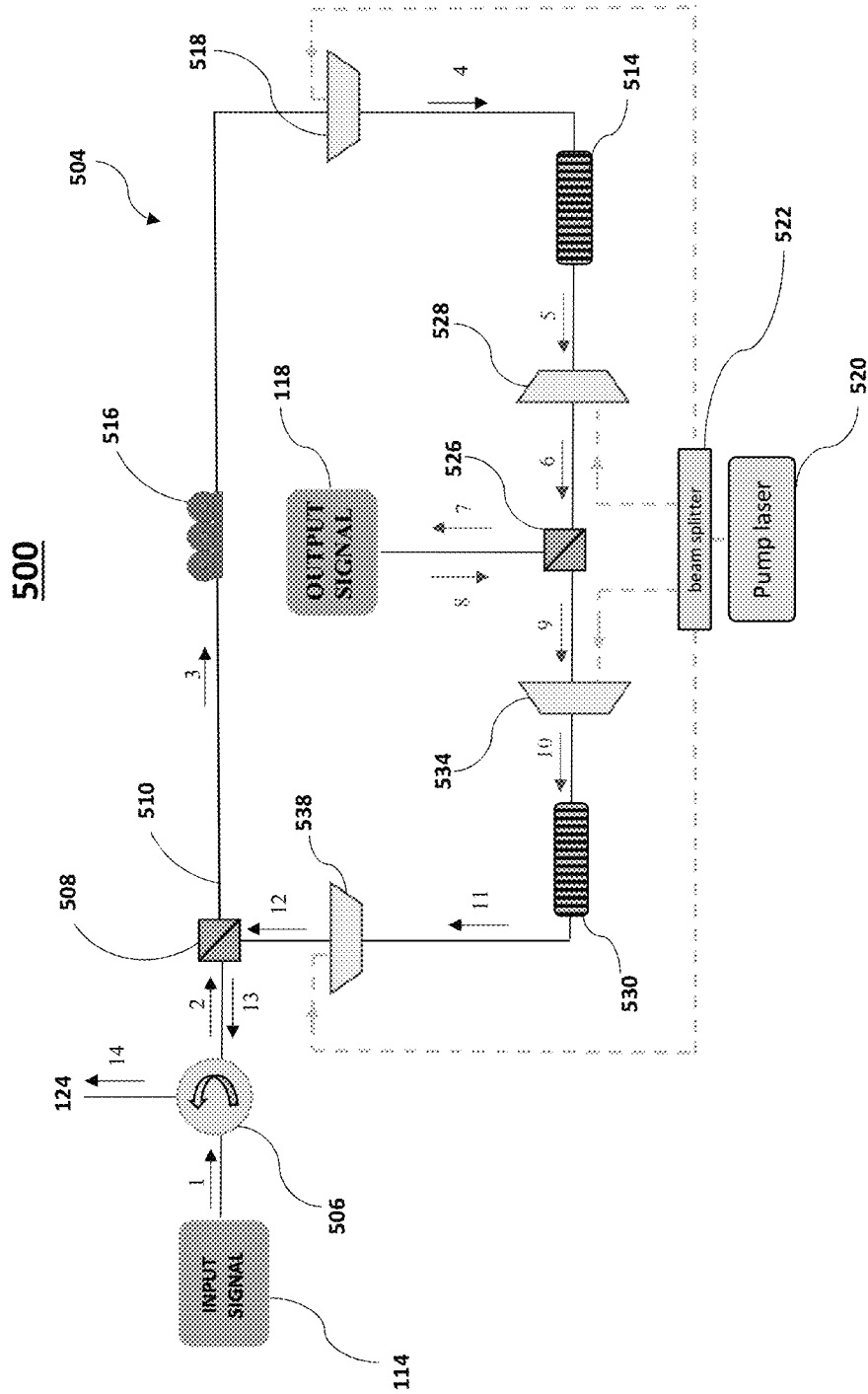
FIG. 5A illustrates an aspect of the wavelength conversion scheme shown in FIG. 5.

To aid in understanding the operation of wavelength conversion loop 504, FIG. 5A shows the circulation of first polarization component 510 in a clockwise direction around wavelength conversion loop 504 using numbered arrows 1-14. Numbered arrows 1-4 and 11-14 indicate the portions of wavelength conversion loop 504 where first polarization component 510 has a wavelength Numbered arrows 5-10 indicate the portions of wavelength conversion loop 504 where first polarization component 510 has a wavelength $\lambda_2$. As shown in FIG. 5A, these portions are the "inside" portions of wavelength conversion loop 504 (i.e., between wavelength converting components 514, 530).

It should be understood that reversing the directions of numbered arrows 1-14 in FIG. 5A would show the circulation of second polarization component 512 in a counter-clockwise direction around wavelength conversion loop 504. Numbered arrows 1-4 and 11-14 would indicate the portions of wavelength conversion loop 504 where second polarization component 512 has a wavelength $\lambda_1$. Numbered arrows 5-10 would indicate the portions of wavelength conversion loop 504 where second polarization component 512 has a wavelength $\lambda_2$.

The wavelength conversion scheme 500 can be implemented using optical fibers, including as appropriate single mode fibers, multimode fibers, and polarization-maintaining fibers. The wavelength conversion scheme 500 can be implemented based on commercially available optical components.

In accordance with an embodiment of the present invention, the input signal 114 can have a wavelength $\lambda_1$ of 905 nm or 850 nm. In accordance with another embodiment of the present invention, the laser signal 118 at polarization multiplexer/demultiplexer 526 can have a wavelength $\lambda_2$ of 1550 nm.

Figure 5B:
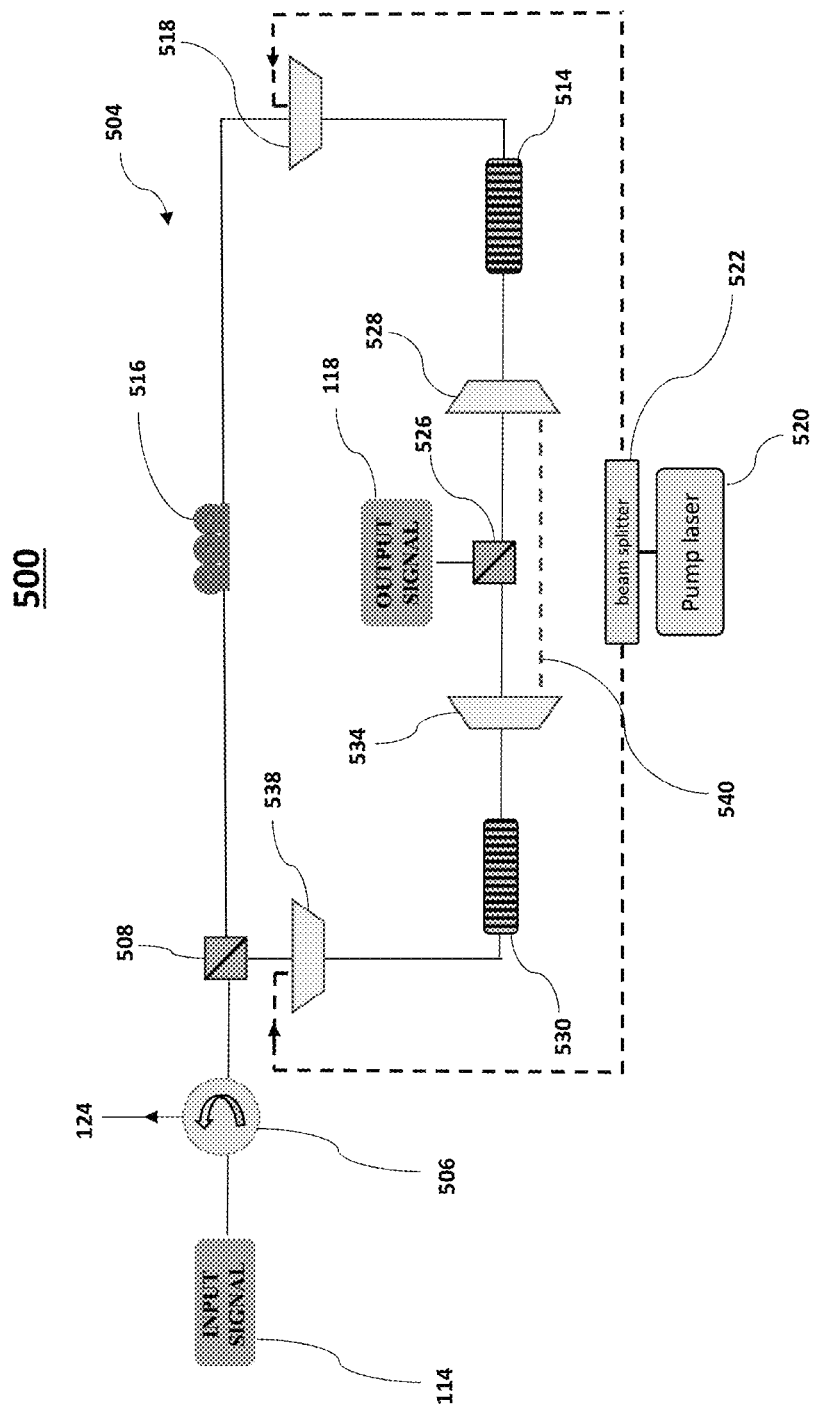
FIG. 5B shows a modification of the embodiment of the wavelength conversion scheme shown in FIG. 5.

A well-known method to perform wavelength conversion is to use a nonlinear process. In this case, usually, a pump laser is needed, and the wavelength conversion medium could be a nonlinear crystal and any form of a nonlinear medium. In some of the nonlinear process, the pump laser 520 is undepleted. In view of this fact, in accordance with another embodiment in accordance with the present invention, the wavelength conversion scheme 500 can employ a pump recycling which recirculates residual pump power from one nonlinear conversion medium to be used in another one (or in the same wavelength conversion component). As shown in FIG. 5B, in the wavelength conversion scheme 500, pump recycling can be implemented by connecting wavelength-division multiplexers 528, 534 to one another via connection 540. In alternative embodiments, pump recycling can be implemented using a highly reflective coating inside each wavelength conversion component 514, 530.

Figure 6:
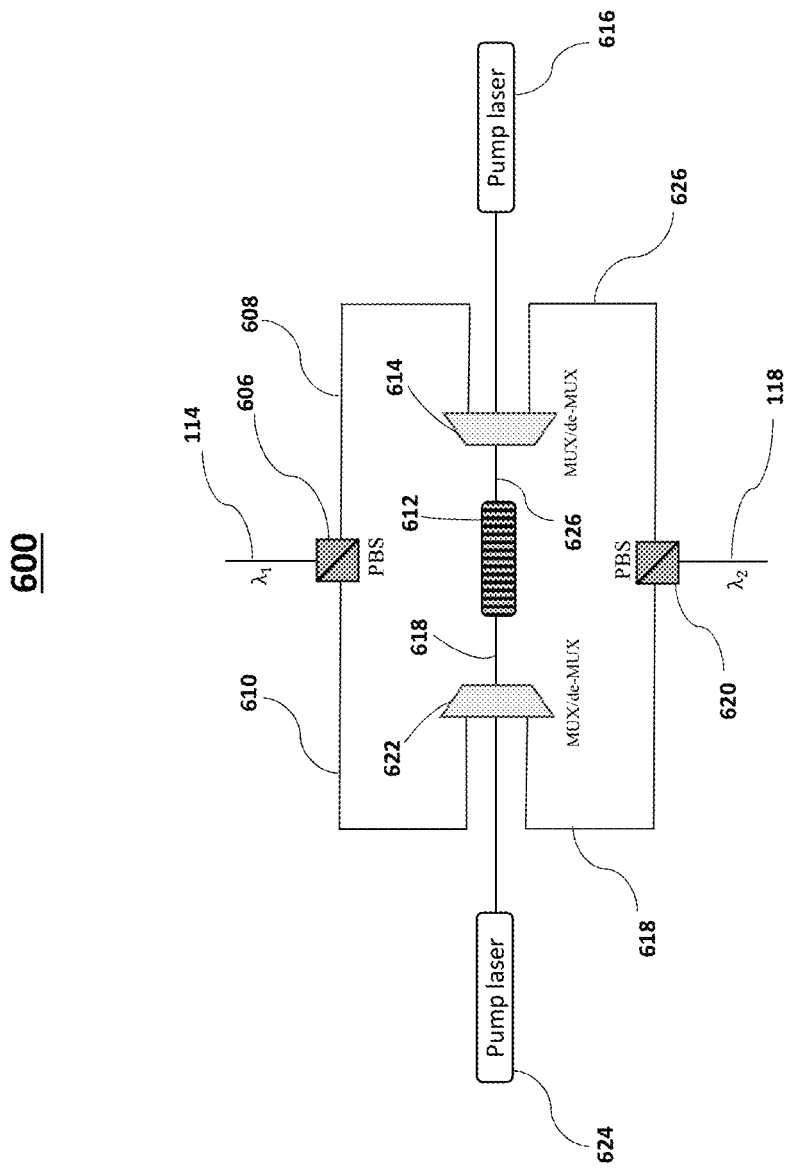
FIG. 6 shows a schematic diagram of an alternative embodiment of a wavelength converter in accordance with the present invention.

Another embodiment of wavelength converter 116 using a waveform conversion scheme 600 in accordance with the present invention is shown in FIG. 6.

Laser signal 114 (see FIG. 1) having a wavelength $\lambda_1$ is provided to polarization multiplexer/demultiplexer 606. If input signal 114 is a single-polarization signal, then it may exit polarization multiplexer/demultiplexer 606 and proceed to wavelength converting component 612 through either wavelength-division multiplexer 614 or wavelength-division multiplexer 622. In either event, wavelength converting component 612 converts the laser signal 114 having wavelength $\lambda_1$ to laser signal 118 having a wavelength $\lambda_2$. Laser signal 118 is then provided to polarization multiplexer/demultiplexer 620 through the other wavelength-division multiplexer and is sent to target 122.

If the signal 114 is a dual-polarization signal, polarization multiplexer/demultiplexer 606 separates the laser signal 114 into a first polarization component 608 and a second polarization component 610. The first polarization component 608 is provided to wavelength converting component 612 through wavelength-division multiplexer 614. Pump laser 616 is also provided to wavelength converting component 612 through wavelength-division multiplexer 614. Wavelength converting component 612 converts the wavelength of the first polarization component 608 from $\lambda_1$ to $\lambda_2$ and provides a converted first polarization component 618 to a polarization multiplexer/demultiplexer 620 through wavelength-division multiplexer 622.

Similarly, the second polarization component 610 is provided to wavelength converting component 612 through wavelength-division multiplexer 622. Pump laser 624 is also provided to wavelength converting component 612 (if needed) through wavelength-division multiplexer 622. Wavelength converting component 612 converts the wavelength of the second polarization component 610 from $\lambda_1$ to $\lambda_2$ and provides a converted second polarization component 626 to polarization multiplexer/demultiplexer 620 through wavelength-division multiplexer 614. The converted first and second polarization components 618, 626 are combined in polarization multiplexer/demultiplexer 620 into laser signal 118 having a wavelength $\lambda_2$. Laser signal 118 is then sent to target 122.

Figure 6A:
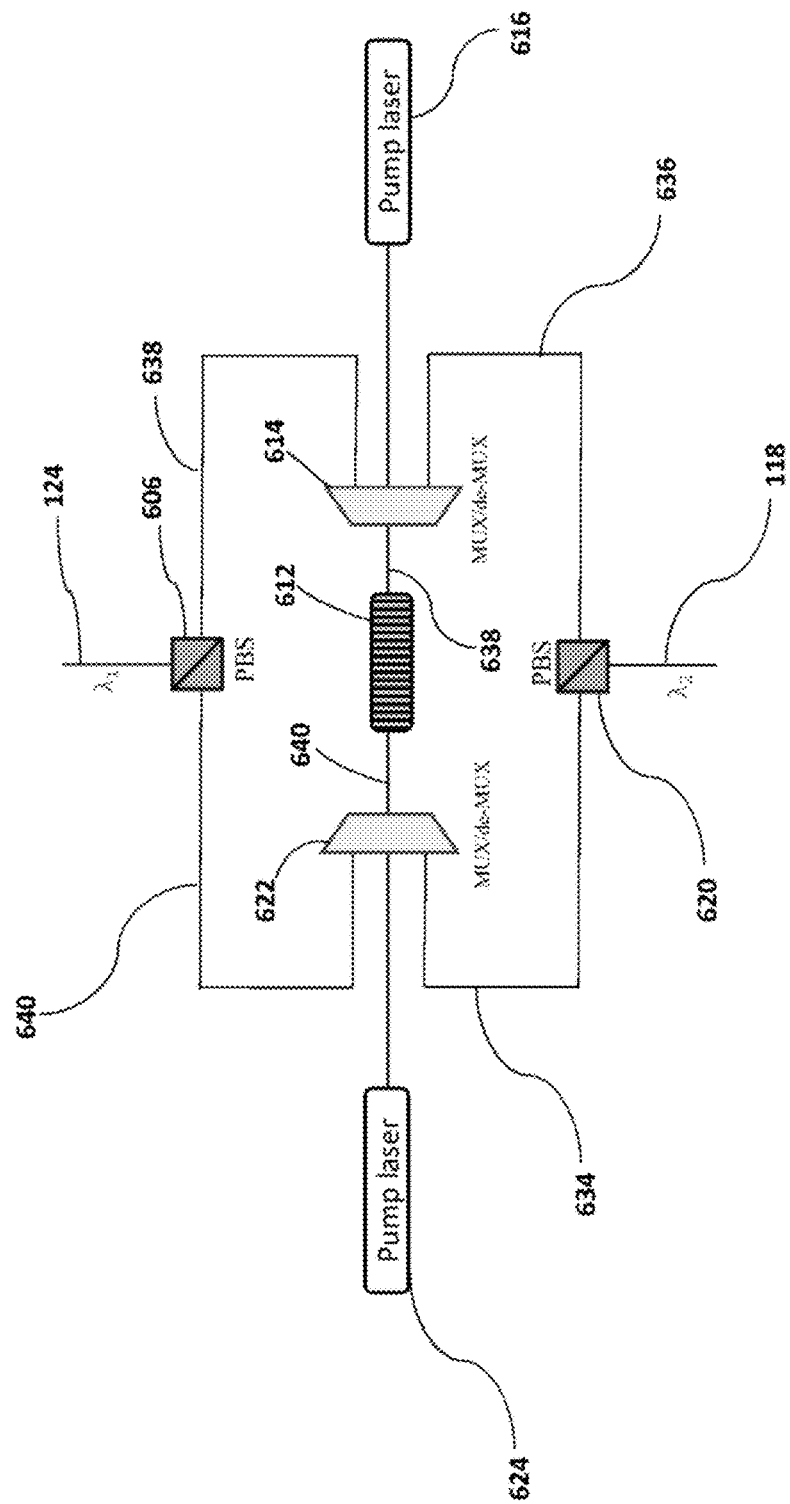
FIG. 6A illustrates an aspect of the operation of the wavelength converter shown in FIG. 6.

The operation of waveform conversion scheme 600 when laser signal 118 having a wavelength $\lambda_2$ is converted to laser signal 124 having wavelength $\lambda_1$ will now be described. Referring to FIG. 6A, laser signal 118 having a wavelength $\lambda_2$ is provided to polarization multiplexer/demultiplexer 620. If laser signal 118 is a single-polarization signal, then it may exit polarization multiplexer/demultiplexer 620 and proceed to wavelength converting component 612 through either wavelength-division multiplexer 614 or wavelength-division multiplexer 622. In either event, wavelength converting component 612 converts the laser signal 118 having wavelength $\lambda_2$ to laser signal 124 having a wavelength $\lambda_1$. Laser signal 124 is then provided to polarization multiplexer/demultiplexer 606 through the other wavelength-division multiplexer and is sent to detector 124.

If laser signal 118 is a dual-polarization signal, then polarization multiplexer/demultiplexer 620 separates the laser signal 118 into a first polarization component 634 and a second polarization component 636. The first polarization component 634 is provided to wavelength converting component 612 through wavelength-division multiplexer 622. Pump laser 624 is also provided to wavelength converting component 612 through wavelength-division multiplexer 622. Wavelength converting component 612 converts the wavelength of the first polarization component 634 from $\lambda_2$ to $\lambda_1$ and provides a converted first polarization component 638 to polarization multiplexer/demultiplexer 606 through wavelength-division multiplexer 614.

Similarly, the second polarization component 636 is provided to wavelength converting component 612 through wavelength-division multiplexer 614. Pump laser 616 is also provided to wavelength converting component 612 (if needed) through wavelength-division multiplexer 614. Wavelength converting component 612 converts the wavelength of the second polarization component 636 from $\lambda_2$ to $\lambda_1$ and provides a converted second polarization component 640 to polarization multiplexer/demultiplexer 606 through wavelength-division multiplexer 622. The converted first and second polarization components 638, 640 are combined in polarization multiplexer/demultiplexer 606 into laser signal 124 having a wavelength $\lambda_1$. Laser signal 124 is then provided to detector 126.

As described above, a signal having a wavelength $\lambda_2$ coming from the second port of waveform correction scheme 600 will be converted to wavelength $\lambda_1$ in its first port. Thus, waveform correction scheme 600 works for both wavelengths $\lambda_1$ and $\lambda_2$ as the input wavelength. If the input wavelength is $\lambda_1$, then the output wavelength will be $\lambda_2$, and vice versa. Waveform correction scheme 600 can work for both single and double-polarization signals. One main advantage of waveform correction scheme 600 is its very fast response time.

FIG. 7 shows the constellation pattern provided by wavelength conversion scheme 500 of FIG. 5 for the consecutive up- and down-conversion of dual-polarization QPSK data. The dual polarization QPSK data was up-converted to a wavelength of 633 nm and consecutively down-converted to a wavelength of 1560 nm. No delay compensation or any amplitude balancing between the two polarizations of the QPSK data was needed.

The novel and inventive wavelength converter 116 in accordance with embodiments of the present invention provides several benefits and advantages. The wavelength converter 116 has broadband application although it does not require broadband components. It works from continuous-wave to high bit-rate signals since it has an almost instantaneous response time. The wavelength converter 116 is phase-insensitive, which makes it suitable for phase-encoded signals. It also does not matter what signal constellation (phase encoding) the input signals use.

Wavelength converter 116 is further independent of the input polarization state and works for both single- and dual-polarization signals. In other words, any input signal (regardless of its properties such as polarization, phase, temporal shape, and bitrate) will be converted to another wavelength at the output while preserving the properties of the input signal enabling using more of the spectrum where commercial hardware is not available.

The LiDAR signal sent to the target 122 can be tuned by using a tunable pump laser 520 while keeping the emitter and detector wavelengths 114 and 124 fixed. The signal sent to the target $\lambda_2$ can be tuned to $\lambda_2'$ while the $\lambda_1$ is fixed by only tuning the pump laser. This could be useful for example if there is ambient noise at $\lambda_2$.

Since both up-conversion and down-conversion are performed in the same loop, the wavelength converter 116 provides high environmental stability (e.g., reduces the effect of temperature fluctuations) and it reduces the effects of amplitude noise (i.e., distortion) of the converted signal. Since both polarization components of a dual polarization signal travel only in different directions within the same loop, polarization mode dispersion (PMD) is minimized and there is no need to add a delay-line to compensate for PMD. Also, the counter-propagating scheme in the same loop automatically results in a balanced wavelength conversion for both polarizations and reduces the bit error rate penalty due to an imbalance between the two orthogonal polarizations. This resolves the need to balance the two polarizations' amplitudes using a polarization-dependent optical attenuator.

The wavelength converter 116 in accordance with the embodiments of the present invention reduces complexity and cost. The single-loop counter-propagating wavelength conversion scheme in accordance with embodiments of the present invention is less complex than conventional wavelength conversion schemes and is less costly as it only uses two (or even one) non-linear conversion devices (e.g., wavelength converting components) for wavelength conversion. The wavelength converter 116 in accordance with embodiments of the present invention also enables implementation of all-optical wavelength conversion.

In accordance with an additional embodiment of the present invention, a telecommunication signal can be sent along with the LiDAR signal to the target 122. Due to the dual-polarization, phase-transparent, and fast response time of the wavelength conversion apparatus and method described in accordance with embodiments of the present invention, a phase-encoded, dual-polarization, and pulsed signal (all or any combination of these encodings mentioned) can be wavelength converted using the same apparatus to carry information to target 122 and to receive information from target 122. The received signal from target 122 does not necessarily need to be reflected from target 122, but could instead be independently emitted from target 122. For example, this approach could be used for LiDAR and vehicle-to-vehicle (V2V) telecommunications.

In alternative embodiments in accordance with the present invention, both wavelengths $\lambda_1$ and $\lambda_2$ can be sent to the target 122. This could be done using a residual $\lambda_1$ signal after the wavelength converter 116. Also, the wavelength converter 116 could be designed to have partial conversion efficiency.

Finally, due to residual pump recycling in optical embodiments in accordance with the present invention, residual pump laser power from one wavelength converting component can be used in another wavelength converting component (or in the same wavelength converting component), thereby reducing laser pump power consumption considerably and thus increasing total power efficiency.

While this invention has been described in conjunction with exemplary embodiments outlined above and illustrated in the drawings, it is evident that the principles of the present invention may be implemented using any number of techniques, whether currently known or not, and many alternatives, modifications and variations in form and detail will be apparent to those skilled in the art. Modifications, additions, or omissions may be made to the systems, apparatuses, and methods described herein without departing from the scope of the present invention. For example, the components of the systems and apparatuses may be integrated or separated. Furthermore, the operations of the systems and apparatuses disclosed herein may be performed by more, fewer, or other components and the methods described may include more, fewer, or other steps. Additionally, steps may be performed in any suitable order.

Accordingly, the exemplary embodiments of the invention, as set forth above, are intended to be illustrative, not limiting, and the spirit and scope of the present invention are to be construed broadly and limited only by the appended claims, and not by the foregoing specification.

In addition, unless otherwise specifically noted, articles depicted in the drawings are not necessarily drawn to scale.

What is claimed is:

1. A LiDAR system, comprising:
an emitter that emits laser light having a first wavelength;
a wavelength converter that converts the emitted laser light from the first wavelength to a second wavelength before the laser light is transmitted toward the target and, after reflected laser light is received from the target, converts the reflected laser light from the second wavelength to the first wavelength; and
a detector that receives the reflected laser light having the first wavelength from the wavelength converter;
wherein the wavelength converter comprises a wavelength-conversion loop that converts the first wavelength to the second wavelength and converts the second wavelength to the first wavelength, the wavelength-conversion loop comprising a first wavelength-conversion medium and a second wavelength-conversion medium.

2. The LiDAR system of claim 1, wherein the first wavelength-conversion medium converts the first wavelength to the second wavelength or converts the second wavelength to the first wavelength based on a direction that the emitted laser light or the reflected laser light travels through the first wavelength-conversion medium.

3. The LiDAR system of claim 2, wherein the first wavelength-conversion medium comprises a non-linear medium.

4. The LiDAR system of claim 3, wherein the first wavelength-conversion medium comprises periodically poled lithium niobate.

5. The LiDAR system of claim 1, wherein the second wavelength-conversion medium converts the first wavelength to the second wavelength or converts the second wavelength to the first wavelength based on a direction that the emitted laser light or the reflected laser light travels through the second wavelength-conversion medium.

6. The LiDAR system of claim 5, wherein the second wavelength-conversion medium comprises a non-linear medium.

7. The LiDAR system of claim 6, wherein the second wavelength-conversion medium comprises periodically poled lithium niobate.

8. The LiDAR system of claim 1, wherein telecommunication information is transmitted along with the LiDAR signal.

9. The LiDAR system of claim 1, wherein the detector is a silicon detector.

10. The LiDAR system of claim 1, wherein the first wavelength is in a wavelength region that runs from the visible spectrum up to about 1 μm.

11. The LiDAR system of claim 1, wherein the first wavelength is about 905 nm.

12. The LiDAR system of claim 1, wherein the second wavelength is about 1550 nm.

13. The LiDAR system of claim 1, wherein the first wavelength is about 850 nm.

14. The LiDAR system of claim 1, wherein the second wavelength is conducive to human eye safety.

15. The LiDAR system of claim 1, wherein the first wavelength-conversion medium and the second wavelength-conversion medium define first and second portions of the wavelength-conversion loop, wherein the first portion of the wavelength-conversion loop has the first wavelength and the second portion of the wavelength-conversion loop has the second wavelength.

16. The LiDAR system of claim 1, wherein:
the first wavelength-conversion medium is coupled to an input of the wavelength-conversion loop and to an output of the wavelength-conversion loop; and
the second wavelength-conversion medium is coupled to the input of the wavelength-conversion loop and to the output of the wavelength-conversion loop.

17. The LiDAR system of claim 16, wherein the first wavelength-conversion medium is configured to convert the first wavelength to the second wavelength and to convert the second wavelength to the first wavelength based on whether the emitted laser light or the reflected laser light travels through the first wavelength-conversion medium in a clockwise direction or in a counter-clockwise direction of the wavelength-conversion loop.

18. The LiDAR system of claim 16, wherein the second wavelength-conversion medium is configured to convert the first wavelength to the second wavelength and to convert the second wavelength to the first wavelength based on whether the emitted laser light or the reflected laser light travels through the second wavelength-conversion medium in a clockwise direction or a counter-clockwise direction of the wavelength-conversion loop.

19. The LiDAR system of claim 16, wherein the first wavelength-conversion medium and the second wavelength-conversion medium define first and second portions of the wavelength-conversion loop, wherein the first portion of the wavelength-conversion loop has the first wavelength and the second portion of the wavelength-conversion loop has the second wavelength.

20. A LiDAR system, comprising:
an emitter that emits laser light having a first wavelength;
a wavelength converter that converts the emitted laser light from the first wavelength to a second wavelength before the laser light is transmitted toward the target and, after reflected laser light is received from the target, converts the reflected laser light from the second wavelength to the first wavelength; and
a detector that receives the reflected laser light having the first wavelength from the wavelength converter;
wherein both the first wavelength and the second wavelength are transmitted to the target.

* * * * *